G. LEHNHERR.
STUMP PULLING AND HANDLING MACHINE.
APPLICATION FILED MAR. 13, 1914.
1,181,776.
Patented May 2, 1916.
3 SHEETS—SHEET 1.
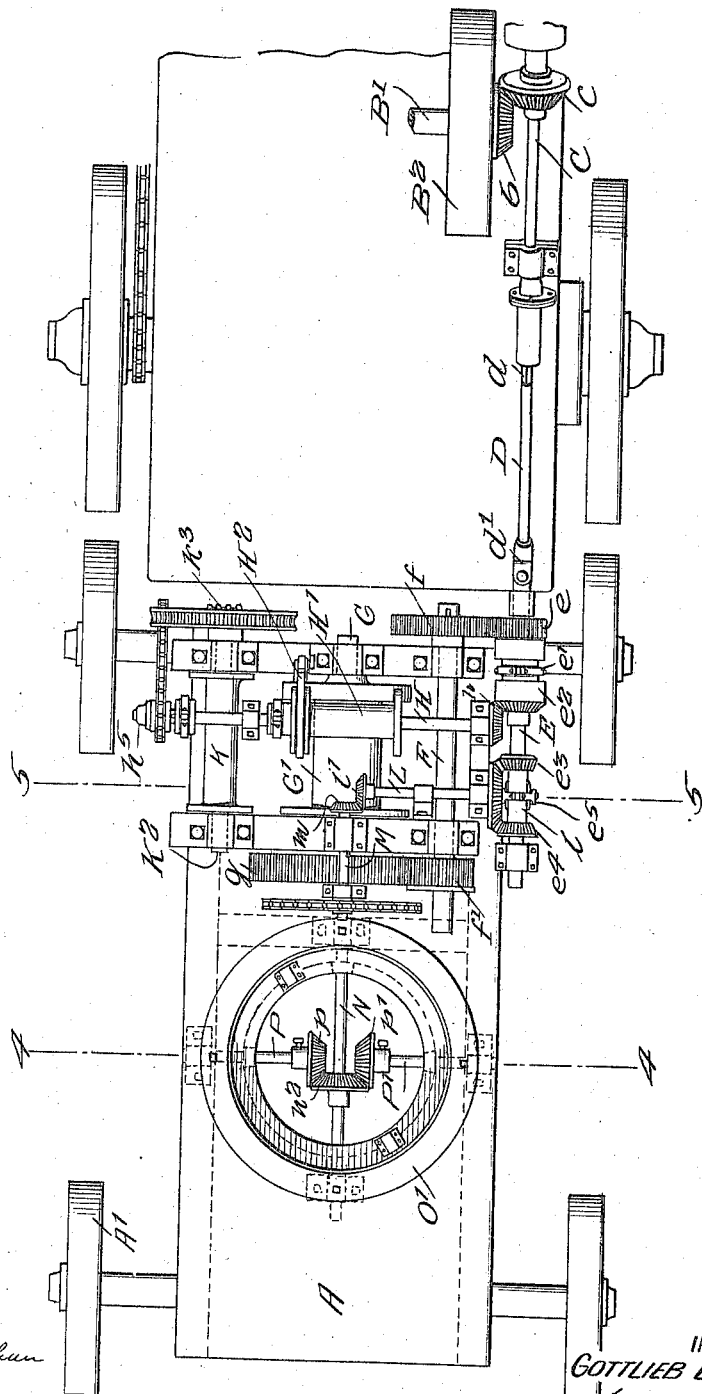
WITNESSES
E. M. Callaghan
Myron G. Clear
INVENTOR
GOTTLIEB LEHNHERR,
BY Munn & Co.
ATTORNEYS

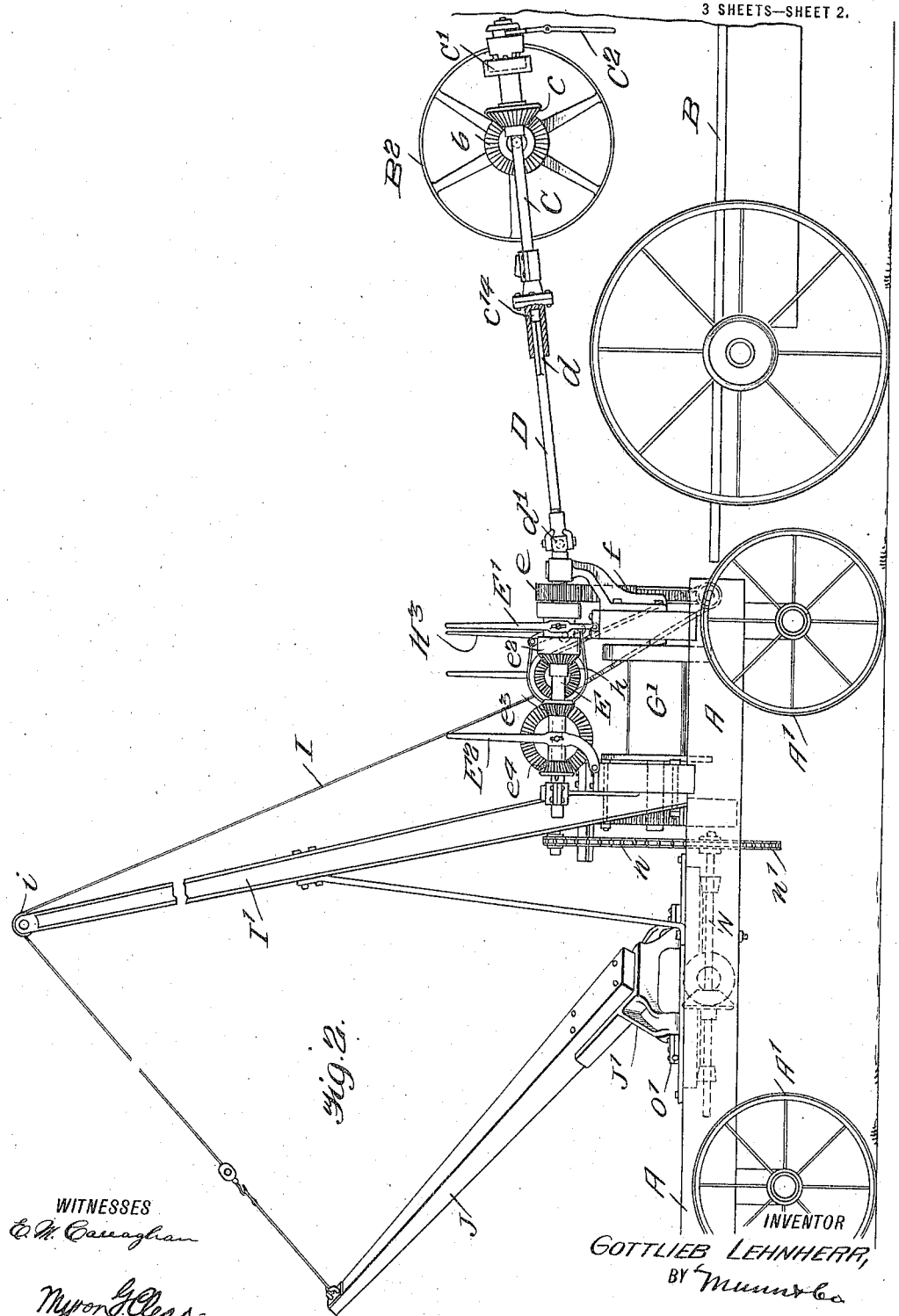

G. LEHNHERR.
STUMP PULLING AND HANDLING MACHINE.
APPLICATION FILED MAR. 13, 1914.
1,181,776.
Patented May 2, 1916.
3 SHEETS—SHEET 3.
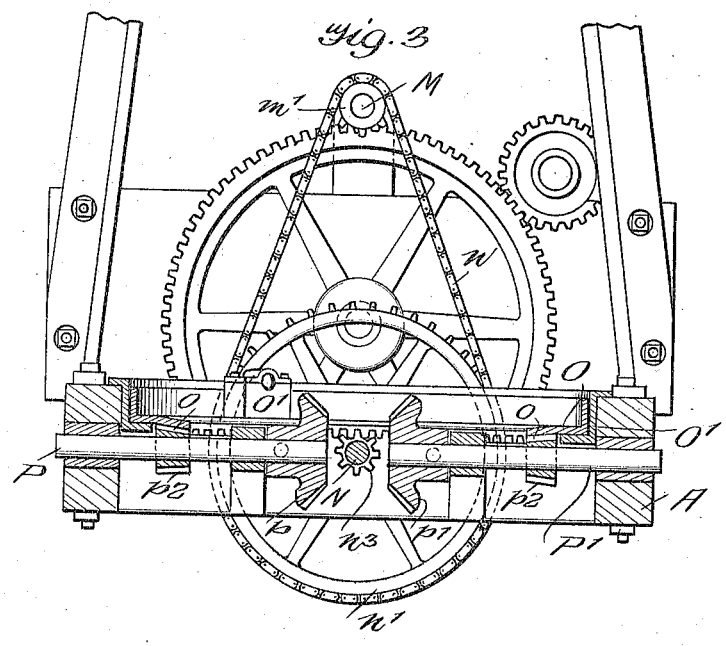
WITNESSES
INVENTOR
GOTTLIEB LEHNHERR,
BY
ATTORNEYS

UNITED STATES PATENT OFFICE.

GOTTLIEB LEHNHERR, OF PITTSVILLE, WISCONSIN.

STUMP PULLING AND HANDLING MACHINE.

1,181,776.   Specification of Letters Patent.   Patented May 2, 1916.

Application filed March 13, 1914. Serial No. 824,399.

*To all whom it may concern:*

Be it known that I, GOTTLIEB LEHNHERR, a citizen of the United States, and a resident of Pittsville, in the county of Wood and State of Wisconsin, have invented an Improvement in Stump Pulling and Handling Machines, of which the following is a specification.

My present improvements relate particularly to a turntable construction forming part of a stump pulling and handling machine of the nature to be presently shown and described, my object being to provide a simple and powerful arrangement for directing the boom of a derrick in a machine of the above nature, together with actuating means capable of imparting movement to the turntable at a plurality of points thereof.

Certain other objects and the advantages arising therefrom will be made to clearly appear in the course of the following description in which reference is made to the accompanying drawings, forming a part of this specification, and in which—

Figure 1 is a plan view, illustrating my improved apparatus in connection with a traction engine of which latter only certain general outlines are illustrated, the mast and swinging boom being removed. Fig. 2 is a side elevation of the parts shown in Fig. 1 with the mast and boom in position, and Fig. 3 is a transverse vertical section taken through the apparatus substantially on line 4—4 of Fig. 1.

My improvements are mounted and utilized in connection with a machine, the frame of which is generally indicated at A and is mounted upon wheels A', is to be drawn by a traction engine or the like, the frame of which is generally indicated at B, suitable couplings connecting the machine which I have not shown as they may be any of the well known types and their illustration would serve no useful purpose.

I have shown only such parts of the traction engine by which my improved machine is transported from place to place and its component parts furnished with the necessary motive power, as will serve to show the means which I contemplate for utilizing the power of the traction engine. I have therefore shown the fly wheel shaft of the traction engine at B' (see Fig. 1), the fly wheel B² of which is preferably provided with a bevel gear $b$ either attached to or forming a part of its hub, this gear being in mesh with a gear $c$ mounted upon a sleeve $c'$ in turn disposed loosely upon a driven shaft C which is rotatably supported in suitable bearings connected to the traction engine, sleeve $c'$ being adapted to be connected to shaft C by a suitable clutch including a controlling handle C².

The rear end of shaft C has a rigid sleeve $c^{14}$, the bore of which is squared to receive the similarly shaped end $d$ of a tumbling rod D, the opposite end of which is connected, by means of a substantially universal joint at $d'$, with the outer end of the main driven shaft E mounted in bearings on the frame A of my improved machine.

Mounted on the main shaft E adjacent its outer end is a pinion $e$ which is controlled by a clutch $e'$, of the internal expanding type and which is in mesh with a somewhat larger pinion $f$ secured upon the outer end of a parallel shaft F, this latter shaft having a small pinion $f'$ secured upon its inner end and in mesh with a somewhat larger pinion $g$ mounted upon the rear end of a shaft G on which is secured the main drum G', this drum receiving the rope (not shown) which is extended laterally from one side of the frame of the machine and attached to the stump to be pulled from the ground, the gearing for driving this drum as thus described being such as to develop sufficient power for the purpose.

The clutch $e'$ is moved forwardly to connect pinion $e$ with shaft E and is controlled by a vertical projecting lever E' as seen in Fig. 2 and may be moved rearwardly to engage a bevel gear $e^2$ also mounted on shaft E and in mesh with a similar bevel gear $h$ secured upon one end of a shaft H intermediately of which is loosely mounted the drum H' upon which is wound the boom controlling cable I, a clutch connecting this drum H' with its shaft H just mentioned. One end flange of the drum H' is engaged by a brake band H² by which movement of the drum is controlled when its clutch is released.

Mast I' which is inclined slightly in a rearward direction and rises from the frame of the machine, is provided with a pulley $i$ at its upper end over which the cable I passes, this cable being connected to the outer end of the boom J which is adjustable at its lower end to extend at a desired angle with respect to the machine and which may be moved to so adjust the same by the means to be hereinafter described.

At its relatively opposite end shaft H is provided with a sprocket wheel $h^5$ connected by a depending sprocket chain $k$, to a lower worm shaft having a worm in mesh with a worm wheel $k^3$ mounted upon the rear end of a shaft $K^2$ on which is secured the anchor drum K which receives one end of a rope or cable (not shown) to be extended laterally and secured to a suitable support and then drawn taut by winding upon drum K to off-set the strain of the machine in the opposite direction when a stump is being pulled.

Mounted at spaced points adjacent the inner end of the main shaft E are a pair of facing bevel gears $e^3$ and $e^4$, between which operates a clutch $e^5$ also of the internal expanding type, the action of which is controlled by an upright lever $E^2$ as seen in Fig. 2. Each of these bevel gears is in engagement with a somewhat larger bevel gear $l$ mounted upon one end of a relatively short transverse shaft L having a bevel gear $l'$ at its opposite end, gears $e^3$ and $e^4$ engaging relatively opposite sides of said gear L so that by throwing the clutch lever $E'$ forwardly, rotation is communicated to shaft L in one direction and by throwing the clutch lever rearwardly, gear $e^4$ is engaged with the shaft E and rotation is communicated to shaft L in the relatively opposite direction. Gear $l'$ at the inner end of shaft L is in engagement with a similar bevel gear $m$ at the forward end of a shaft M mounted longitudinally above the main drum gear $g$, this shaft having a sprocket wheel $m'$ at its rear end connected, by means of a vertically disposed sprocket chain $n$, to an enlarged sprocket wheel $n'$ mounted upon the forward end of the boom controlling shaft N.

The shaft N above mentioned is extended rearwardly and longitudinally of the frame A and journaled beneath the surface thereof to extend diametrically across a turntable opening formed in the said frame, this turntable opening having a stationary surrounding ring O' forming a bearing for a turntable O all as best shown in Figs. 1 and 3. The controlling shaft N is provided with an intermediate bevel gear $n^2$ located within the turntable opening and in engagement with similar gears $p$ and $p'$ secured upon the inner ends of relatively short shafts P and P' respectively, these latter shafts being journaled in the same horizontal plane with the controlling shaft N and extending upon opposite sides thereof and at right angles thereto. The shaft N and shafts P and P' are provided with small pinions $n^3$ and $p^2$ in engagement with a circular rack $o$ formed upon the lower surface of the turntable O so that when rotation is communicated to shaft N in either direction through the connections above stated, the several pinions $n^3$ and $p^2$ will be turned to move the turntable in a corresponding direction.

The lower end of the boom J is mounted in a casting J' forming a foot piece and having laterally projecting trunnions journaled in bearings $o'$ extending upwardly from the turntable and by this means the boom may be readily moved or swung either vertically or horizontally or both when the stumps are hitched by suitable connections to the boom end for transportation from one portion of the field to another and suitably piled for final disposition. Thus in the operation of my device and after a stump has been pulled at the side of the machine clutch lever $E^2$ is then manipulated to clutch either of the gear wheels $e^3$ and $e^4$ and power is transmitted through the connections before described with the turntable to swing the stump around to a position in the rear of the machine. In such a position its weight will be balanced to a certain extent by the mechanism upon the frame of the machine most of which is placed upon the forward portion thereof. The anchor rope is then thrown off and the traction engine proceeds to the point where the stumps are to be collected drawing my improved machine with the stump carried thereby. Either gears $e^3$ or $e^4$ may then be clutched to swing the boom to the desired side of the machine. The clutch $h'$ is then thrown off by manipulating $H^4$ and the stump lowered if it is so desired by permitting the cable I to unwind under the control of the band brake $H^2$.

I claim:

1. In a machine of the character described, a turntable consisting of a ring having a circular rack, a driven shaft journaled longitudinally beneath said turntable and having a pinion in engagement with the rack, a pair of axially alined shafts disposed at right angles to, and in the same horizontal plane with, the driven shaft and provided with pinions in engagement with the rack, and gearing connecting the said axially alined shafts with the driven shaft.

2. In a machine of the character described, a turntable consisting of a ring having a circular rack, a driven shaft journaled longitudinally beneath the said turntable and having a pinion in engagement with the rack, a pair of axially alined shafts disposed at right angles to the said driven shaft and provided with pinions at their outer ends in engagement with the rack, and gearing connecting the inner ends of said axially alined shafts with the driven shaft.

3. In a machine of the character described, a turntable consisting of a ring having a circular rack, a plurality of shafts mounted below the turntable and having geared connections between them, each of said shafts having a pinion in engagement with the said turntable rack, and connections for driving one of said shafts whereby to impart movement to the turntable at a plurality of points thereof.

GOTTLIEB LEHNHERR.

Witnesses:
R. R. WILLIAMS,
R. H. SCHROEDER.

Copies of this patent may be obtained for five cents each, by addressing the "Commissioner of Patents, Washington, D. C."